United States Patent
Seo et al.

(10) Patent No.: US 9,369,642 B2
(45) Date of Patent: Jun. 14, 2016

(54) IMAGE SENSOR, IMAGE SIGNAL PROCESSOR AND ELECTRONIC DEVICE INCLUDING THE SAME

(71) Applicant: Samsung Electronics Co., Ltd., Suwon-Si, Gyeonggi-Do (KR)

(72) Inventors: Jong-Seok Seo, Seoul (KR); Junhyun Park, Hwaseong-si (KR); Jae-Hoon Seo, Hwaseong-si (KR); Ilseon Ha, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 20 days.

(21) Appl. No.: 14/283,803

(22) Filed: May 21, 2014

(65) Prior Publication Data

US 2014/0368708 A1   Dec. 18, 2014

(30) Foreign Application Priority Data

Jun. 18, 2013   (KR) ........................ 10-2013-0069748

(51) Int. Cl.
*H04N 5/343* (2011.01)
*H04N 5/345* (2011.01)
*H04N 9/04* (2006.01)
*H04N 5/3745* (2011.01)

(52) U.S. Cl.
CPC ............. *H04N 5/343* (2013.01); *H04N 5/3458* (2013.01); *H04N 5/3745* (2013.01); *H04N 9/045* (2013.01)

(58) Field of Classification Search
CPC ..... H04N 5/343; H04N 5/3458; H04N 9/045; H04N 5/3745; H04N 5/23241
See application file for complete search history.

(56) References Cited

U.S. PATENT DOCUMENTS

| 6,882,370 | B2 | 4/2005 | Ishimoto | |
|---|---|---|---|---|
| 7,098,950 | B2 | 8/2006 | Yamamoto et al. | |
| 8,421,895 | B2 | 4/2013 | Ho et al. | |
| 2002/0089594 | A1* | 7/2002 | Ishimoto | 348/296 |
| 2006/0250513 | A1* | 11/2006 | Yamamoto et al. | 348/294 |
| 2007/0024737 | A1* | 2/2007 | Nakamura et al. | 348/335 |
| 2007/0195192 | A1* | 8/2007 | Miyanari | 348/370 |
| 2008/0002865 | A1* | 1/2008 | Toyoda | 382/118 |
| 2008/0129850 | A1* | 6/2008 | Wang | 348/294 |
| 2008/0259214 | A1* | 10/2008 | Tsumura et al. | 348/572 |
| 2010/0073294 | A1 | 3/2010 | Kim et al. | |
| 2010/0155614 | A1 | 6/2010 | Yagi et al. | |
| 2010/0321516 | A1 | 12/2010 | Kashiwagi et al. | |
| 2011/0298954 | A1 | 12/2011 | Nakaseko | |
| 2012/0229665 | A1* | 9/2012 | Sharman et al. | 348/222.1 |
| 2014/0055635 | A1 | 2/2014 | Seo | |
| 2014/0267790 | A1* | 9/2014 | Rabii et al. | 348/207.1 |

FOREIGN PATENT DOCUMENTS

| JP | 2007-096601 A | 4/2007 |
|---|---|---|
| KR | 100615397 B1 | 8/2006 |
| KR | 2012-0050247 A | 5/2012 |

* cited by examiner

*Primary Examiner* — Jason Flohre
(74) *Attorney, Agent, or Firm* — Harness, Dickey & Pierce, P.L.C.

(57) ABSTRACT

An image sensor is provided which includes a plurality of operation blocks configured to provide an image signal in response to an incident light, and a power supply block configured to supply a power to one or more operation blocks of the plurality of operation blocks based on a selected operation mode or operation interval. The operation mode is one of at least a first mode and a second mode, and a resolution of the image signal generated in the second mode is lower than that generated in the first mode.

12 Claims, 8 Drawing Sheets

Fig. 4

| | Reset Interval | Integration Interval | Readout Interval | Idle Interval |
|---|---|---|---|---|
| Active Pixel Array | ON | ON | ON | OFF |
| Digital | ON | ON | ON | OFF |
| Analog | OFF | OFF | ON | OFF |
| Alive | ON | ON | ON | ON |

Fig. 5

| | Reset Interval | Integration Interval | Readout Interval | Idle Interval |
|---|---|---|---|---|
| Active Pixel Array | ON | ON | ON | OFF |
| Digital | ON | OFF | ON | OFF |
| Analog | OFF | OFF | ON | OFF |
| Alive | ON | ON | ON | ON |

IMAGE SENSOR, IMAGE SIGNAL PROCESSOR AND ELECTRONIC DEVICE INCLUDING THE SAME

CROSS-REFERENCE TO RELATED APPLICATIONS

This application claims priority under 35 U.S.C. §119 to Korean Patent Application No. 10-2013-0069748 filed Jun. 18, 2013, in the Korean Intellectual Property Office, the entire contents of which are hereby incorporated by reference.

BACKGROUND

Inventive concepts described herein relate to an image sensor, an image signal processor, and/or an electronic device including the image sensor and the image signal processor.

A CCD (Charge Coupled Device) image sensor and a CMOS (Complementary Metal Oxide Semiconductor) image sensor are widely used as devices for capturing an image of the object. An image sensor converts an optical signal including image information of the object into an electrical signal. The image sensor is included in various electronic devices. The image sensor performs functions of enabling an electronic device to capture an image of the object and to recognize the object (e.g., face, motion, etc.).

SUMMARY

An image sensor of inventive concepts comprises a plurality of operation blocks configured to provide an image signal in response to incident light; and a power supply block configured to selectively supply power to one or more operation blocks of the plurality of operation blocks based on a selected operation mode or operation interval.

In an example embodiment, the image signal is Bayer data generated based on a Bayer pattern.

In an example embodiment, the operation mode is one of at least a normal mode and a vision mode, and a resolution of the image signal generated in the vision mode is lower than that generated in the normal mode.

In an example embodiment, the plurality of operation blocks comprises an active pixel array block configured to generate an analog signal based on the incident light, an analog block configured to convert the analog signal into an image signal as a digital signal, and a digital block configured to control the active pixel array block and the analog block.

In an example embodiment, the power supply block is configured to turn off analog block during an integration interval of the normal mode where the image sensor generates photo-charges based on the incident light during the integration of the first mode.

In an example embodiment, the power supply block is configured to turn off the analog and digital blocks during an integration interval of the vision mode.

In an example embodiment, the active pixel array block comprises an active pixel array formed of a plurality of unit pixels and is configured to generate the analog signal using selected unit pixels of the plurality of unit pixels in the vision mode.

An image signal processor of inventive concepts operates in one selected from a plurality of operation modes and processes Bayer data to generate image data. The plurality of operation modes includes a normal mode for generating the image data and a vision mode for generating the image data and recognition information, and the image signal processor is configured to select a Bayer data processing path according to the selected mode.

In an example embodiment, the image signal processor is configured to select the selected operation mode based on a control signal provided from an external device.

An electronic device of inventive concepts provides an image signal in response to incident light, and comprises an image sensor including a plurality of operation blocks configured to generate the image signal and configured to selectively turn on the plurality of operation blocks according to an operation mode, an image signal processor configured to process the image signal to generate image data and selectively provide an image signal processing path according to the operation mode and a sensor controller configured to control the operation mode of the image sensor and the image signal processor.

In an example embodiment, the sensor controller controls the operation mode of the image sensor and the image signal processor in response to a mode signal provided from an external device.

In an example embodiment, the operation mode is one of at least a normal mode and a vision mode, and a resolution of the image signal generated in the vision mode is lower than that generated in the normal mode.

In an example embodiment, the image signal processor comprises a common block used in common in the normal and vision modes, and first and second mode blocks processing the Bayer data.

In an example embodiment, the image sensor comprises an active pixel array block generating an analog signal based on the incident light, an analog block converting the analog signal into an image signal as a digital signal and a digital block controlling the active pixel array block and the analog block.

In an example embodiment, the active pixel array block comprises an active pixel array formed of a plurality of unit pixels and generates the analog signal using selected unit pixels of the plurality of unit pixels in the vision mode.

In an example embodiment, the analog block is turned off during an integration interval of the normal mode where photo-charges are generated based on a light incident from an exterior and the analog and digital blocks are turned off during an integration interval of the vision mode.

At least one example embodiment discloses an electronic device including a sensor controller configured to generate a control signal indicating a mode, the mode being one of a first mode and a second mode, an image sensor including a pixel array, an analog block, a digital block and a power supply block, the power supply block configured to selectively apply power to the digital block and the analog block based on the mode, the image sensor configured to produce image data of a higher resolution in the first mode than in the second mode.

In an example embodiment, the digital block includes a timing generator configured to provide clock signals to the pixel array, the power supply configured to turn off the timing generator during a portion of the second mode.

In an example embodiment, the power supply is configured to apply power to the timing generator during an integration interval of the first mode, the image sensor configured to generate photo-charges based on incident light from an exterior during the integration interval of the first mode.

In an example embodiment, the second mode is a recognition mode.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 4 is a table showing blocks turned on in each operation interval when the image sensor illustrated in FIG. 2 operates in a normal mode;

FIG. 5 is a table showing blocks turned on in each operation interval when the image sensor illustrated in FIG. 2 operates in a vision mode;

DETAILED DESCRIPTION

Figure 1:
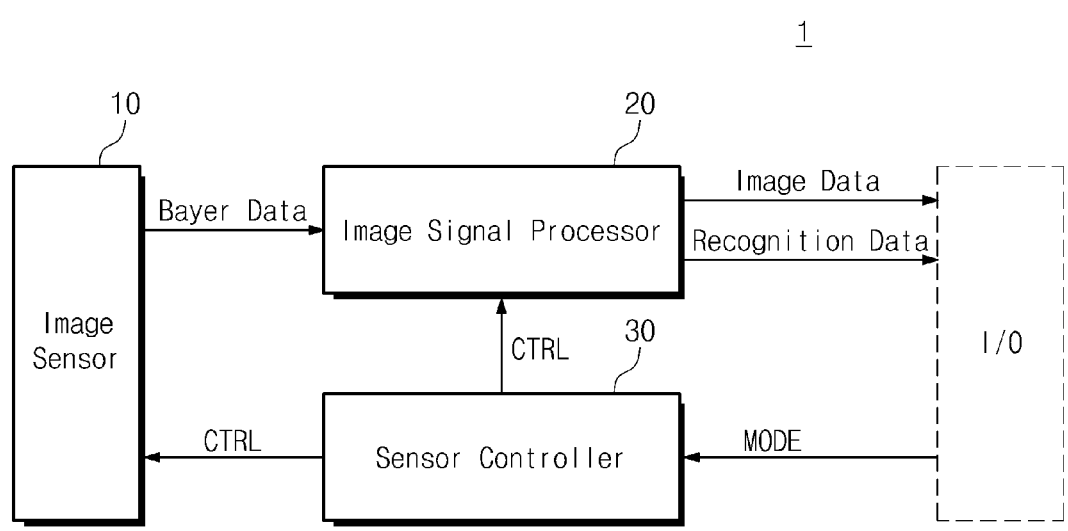
FIG. 1 is a block diagram schematically illustrating an electronic device 1 according to an example embodiment of inventive concepts.

Example embodiments will be described in detail with reference to the accompanying drawings. Inventive concepts, however, may be embodied in various different forms, and should not be construed as being limited only to the illustrated embodiments. Rather, example embodiments are provided as examples so that this disclosure will be thorough and complete, and will convey inventive concepts to those skilled in the art. Accordingly, known processes, elements, and techniques are not described with respect to some example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating an electronic device 1 according to an example embodiment of inventive concepts. Referring to FIG. 1, an electronic device 1 includes an image sensor 10, an image signal processor 20, and a sensor controller 30.

The electronic device 1 has a plurality of operation modes. For example, the electronic device 1 has a normal mode and a vision mode. The normal mode is a mode where typical image data is provided. The vision mode is a mode where image data and recognition information are provided. The recognition information includes recognition information of the object, for example, face detection information or motion recognition information. The electronic device 1 operates by a power suitable for each mode by changing a block being turned on in each operation mode.

The image sensor 10 generates an image signal of the object based on an incident light. The image signal generated by the image sensor 10 is Bayer data. The Bayer data is a digital signal generated based on a Bayer pattern.

The image sensor 10 may include a plurality of blocks. During a Bayer data generating operation, the image sensor 10 selectively turns the plurality of blocks on in response to a control signal CTRL provided from the sensor controller 30.

A part of the plurality of blocks in the image sensor 10 is selectively turned on according to an operation mode. For example, a resolution of image data generated when the electronic device 1 operates in the vision mode is lower than that generated when it operates in the normal mode. The image sensor 10 generates the Bayer data, which is sampled using selected pixels, in response to the control signal CTRL. When operating in the vision mode, the image sensor 10 provides a low resolution of Bayer data with a less power through a sampling operation.

A part of the plurality of blocks of the image sensor 10 is selectively turned on according to an operation interval. During a Bayer data generating operation, the image sensor 10 reduces power consumption by only turning on a block(s) needed when an operation is performed. An operation corresponding to an operation interval of the image sensor 10 will be more fully described with reference to FIGS. 3 to 5.

The image signal processor 20 generates image data by processing Bayer data provided from the image sensor 10. The image signal processor 20 selectively provides a processing path of the Bayer data in response to the control signal CTRL from the sensor controller 30. For example, the image signal processor 20 performs different Bayer data processing operations in the normal mode and the vision mode.

The sensor controller 30 generates the control signal CTRL. The sensor controller 30 controls the image sensor 10 and the image signal processor 20 using the control signal CTRL. The sensor controller 30 generates the control signal CTRL in response to a mode signal MODE provided from an external device. However, inventive concepts are not limited thereto. For example, the sensor controller 30 may include a mode selection circuit for generating the control signal CTRL.

The mode signal MODE is a signal directing an operation mode of the electronic device 1. For example, the electronic device 1 operates in the normal mode when the mode signal MODE is logically 'Low'. The electronic device 1 operates in the vision mode when the mode signal MODE is logically 'High. A format of the mode signal MODE is not limited thereto.

In the electronic device 1, a block to be turned on in each operation mode and each operation interval is variable according to the control signal CTRL. In the electronic device 1, also, a data processing path of each operation mode is variable according to the control signal CTRL. Thus, the image sensor 10 and the image signal processor 20 of the electronic device 1 operate by a power suitable for each mode without unnecessary power consumption.

Figure 2:
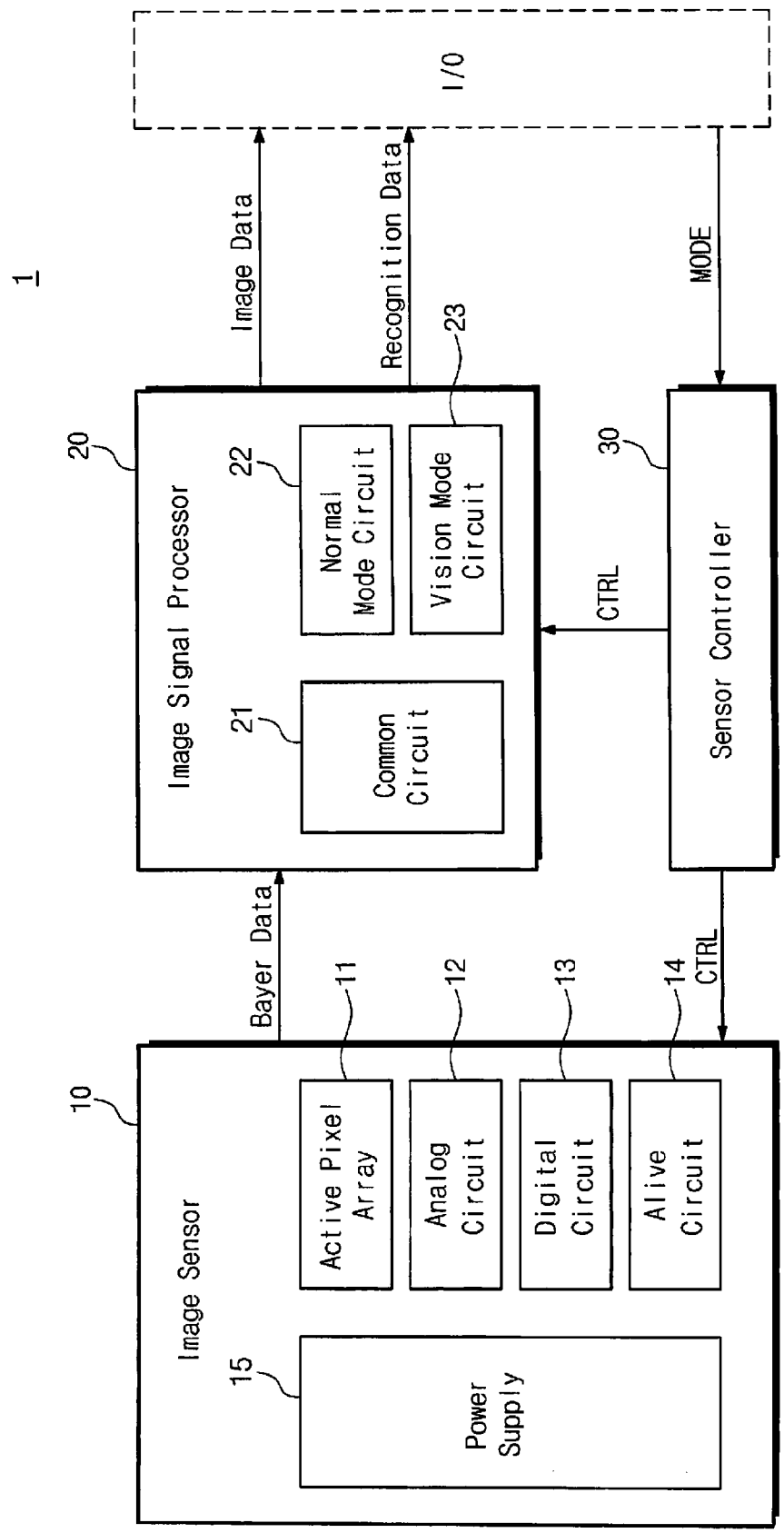
FIG. 2 is a block diagram schematically illustrating an electronic device illustrated in FIG. 1, according to an example embodiment of inventive concepts.

FIG. 2 is a block diagram schematically illustrating an electronic device illustrated in FIG. 1, according to an example embodiment of inventive concepts. Referring to FIG. 2, an electronic device 1 includes an image sensor 10, an image signal processor 20, and a sensor controller 30.

The image sensor 10 includes a plurality of blocks including an active pixel array block 11, an analog block 12, a digital block 13, an alive block 14, and a power supply block 15. The plurality of blocks of the image sensor 10 may be turned on selectively according to an operation mode and an operation interval in response to a control signal CTRL.

The active pixel array block 11 generates an analog signal based on an incident light. The active pixel array block 11 may include an active pixel array formed of a plurality of active pixels and a row driver and decoder for driving the active pixel array. The active pixel array block 11 will be more fully described with reference to FIG. 6.

The analog block 12 converts the analog signal generated from the active pixel array block 11 into a digital signal. The analog block 12 may include a Correlated Double Sampling (CDS) circuit and an Analog-to-Digital Converter (ADC). An operation of the analog block 12 will be more fully described with reference to FIG. 6.

Unlike the active pixel array block 11 and the analog block 12, the digital block 13 is a circuit that operates digitally. The digital block 13 may include a timing generator.

The alive block 14 is a set of circuits for an operation of the image sensor 10. The alive block 14 is turned on during an operation of the image sensor 10.

The power supply block 15 generates a power for driving the image sensor 10. Or, the power supply block 15 is supplied with a power for driving the image sensor 10 from an external device. The power supply block 15 selectively supplies a power to the plurality of blocks of the image sensor 10 according to an operation mode and an operation interval, in response to the control signal CTRL (e.g., by turning on/off a transistor in the power supply block 15 based on the control signal CTRL).

The image signal processor 20 includes a common block 21, a normal mode block 22, and a vision mode block 23. The image signal processor 20 selectively provides a Bayer data processing path in response to the control signal CTRL.

The common block 21 is a block that is used in common in a plurality of modes to process Bayer data. The normal mode block 22 is a block that processes the Bayer data in a normal mode. The vision mode block 23 is a block that processes the Bayer block in a vision mode. In the image signal processor 20, either one of the normal mode block 22 and the vision mode block 23 processes the Bayer data in response to the control signal CTRL.

In the above-described electronic device 1, a block to be turned on in an operation interval of each operation mode and a data processing path are variable according to the control signal CTRL. Thus, the image sensor 10 and the image signal processor 20 of the electronic device 1 operate by a power suitable for each operation mode.

Figure 3:
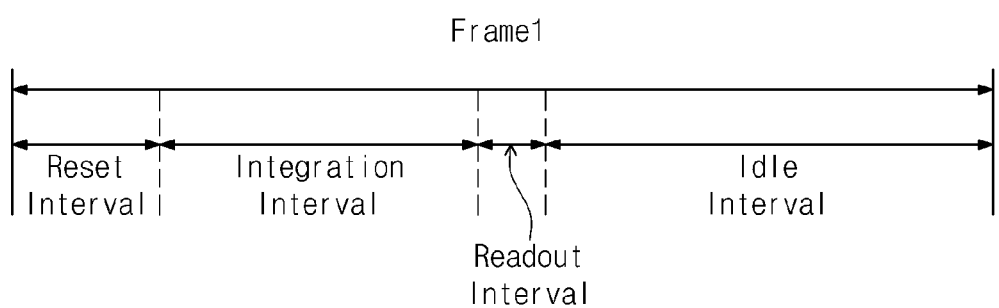
FIG. 3 is a diagram for describing an operation of an image sensor illustrated in FIG. 2.

FIG. 3 is a diagram for describing an operation of an image sensor 10 illustrated in FIG. 2. Referring to FIG. 3, a first frame Frame 1 of an image sensor 10 includes a reset interval, an integration interval, a readout interval, and an idle interval.

During the reset interval, the image sensor 10 is reset. During the reset interval, there are discharged photo-charges stored in a photoelectric conversion unit of the image sensor 10. The photoelectric conversion unit generates photo-charges by converting a light incident from the exterior. The photoelectric conversion unit will be more fully described with reference to FIG. 7.

During the integration interval, the image sensor 10 generates photo-charges based on a light incident from the exterior. During the integration interval, a shutter of the image sensor 10 is opened. The light incident from the exterior is transmitted to the photoelectric conversion unit through the opened shutter. The light transmitted to the photoelectric conversion unit is converted into photo-charges.

During the readout interval, the image sensor 10 generates an analog signal based on photo-charges generated during the integration interval. The analog signal includes information associated with an image of the object collected in form of charge carriers and information associated with a peripheral light. The analog signal generated during the readout interval is converted into Bayer data by a Correlated Double Sampling (CDS) circuit and an Analog-to-Digital Converter (ADC).

During the idle interval, the image sensor 10 operates by a minimum power. The image sensor 10 is at an idle state until a next frame of Bayer data is required.

In the image sensor 10, a block being turned on is variable according to an operation mode and an operation interval. The image sensor 10 operates by a power suitable for each operation mode by selectively supplying a power to a block. This will be more fully described with reference to FIGS. 4 and 5.

FIG. 4 is a table showing blocks turned on in each operation interval when an image sensor 10 illustrated in FIG. 2 operates in a normal mode. Referring to FIG. 4, an image sensor 10 operates by a power suitable for each operation mode by selectively supplying a power to a block needed for an operation of each operation interval.

For example, an analog block 12 (refer to FIG. 2) is turned on only during a readout interval. Since the analog block 12 is a block that converts an analog signal generated by an active pixel array block 11 (refer to FIG. 2) into a digital signal, it is turned off during reset, integration and idle intervals, so that power consumption is reduced.

FIG. 5 is a table showing blocks turned on in each operation interval when an image sensor 10 illustrated in FIG. 2 operates in a vision mode. Referring to FIG. 5, in an image sensor 10, a power of a vision mode is lower than that of a normal mode.

Referring to FIG. 5, a digital block 13 (refer to FIG. 2) is turned off during an integration interval. As the digital block 13 is turned on, the image sensor 10 generates a low resolution of Bayer data and operates by a less power.

Figure 6:
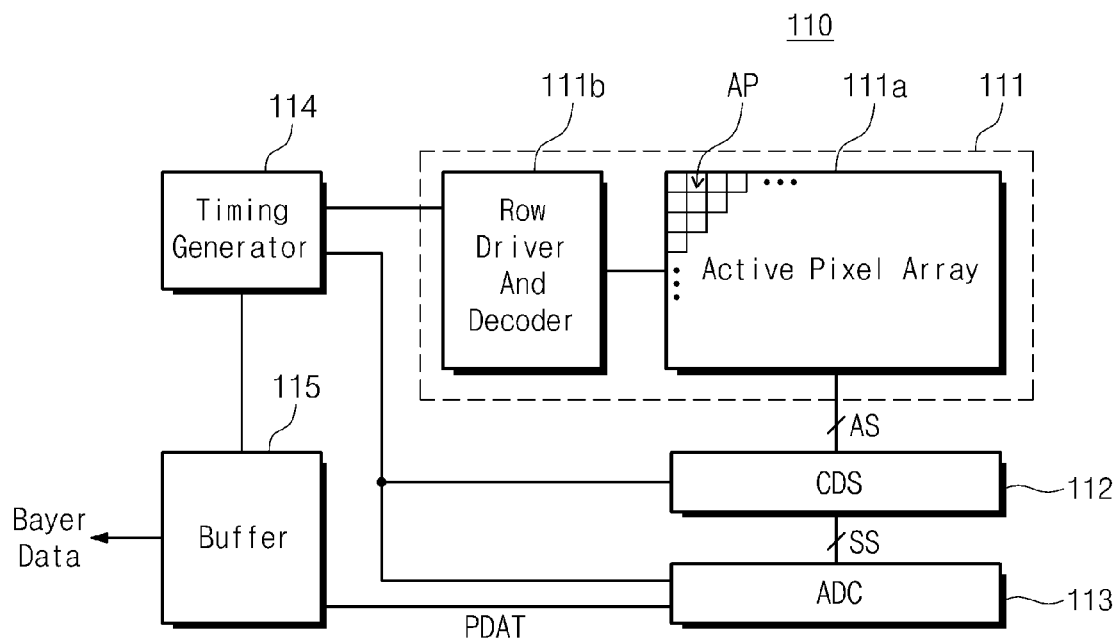
FIG. 6 is a block diagram schematically illustrating an image sensor illustrated in FIG. 1, according to an example embodiment of inventive concepts.

FIG. 6 is a block diagram schematically illustrating an image sensor illustrated in FIG. 1, according to an example embodiment of inventive concepts. Referring to FIG. 6, an image sensor 110 includes an active pixel array block 111, a Correlated Double Sampling (CDS) circuit 112, an Analog-to-Digital Converter (ADC) 113, a timing generator 114, and a buffer 115.

The active pixel array block 111 generates analog pixel signals AS based on a light incident from the exterior. The light incident from the exterior includes image information of the object and information of a peripheral light. The light incident from the exterior is provided to the active pixel array block 111 through to a lens. The active pixel array block 111 includes an active pixel array 111a and a row driver and decoder 111b.

The active pixel array 111a includes a plurality of unit pixels AP. The unit pixels AP are arranged in a matrix form of rows and columns. A unit pixel AP will be more fully described with reference to FIG. 7.

Figure 7:
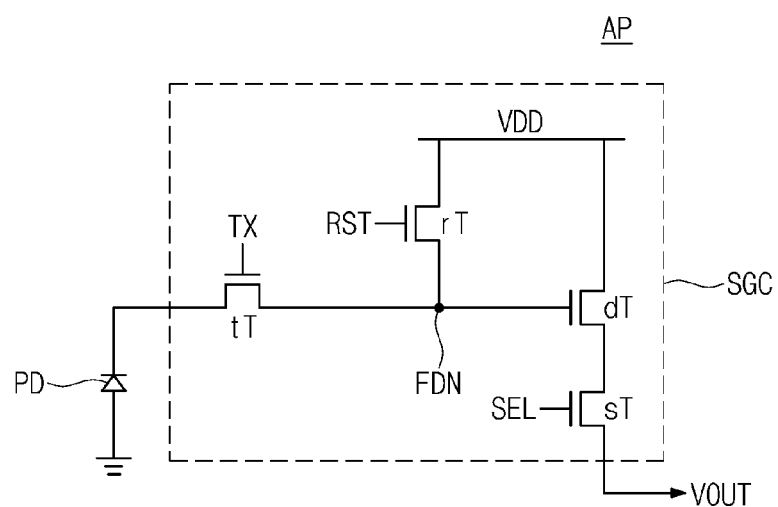
FIG. 7 is a diagram schematically illustrating a unit pixel AP illustrated in FIG. 6, according to an example embodiment of inventive concepts.

FIG. 7 is a diagram schematically illustrating a unit pixel AP illustrated in FIG. 6, according to an example embodiment of inventive concepts. Referring to FIG. 7, a unit pixel AP includes a photoelectric conversion unit PD and a signal generating circuit SGC.

The photoelectric conversion unit PD performs photoelectric conversion. That is, the photoelectric conversion unit PD generates photo-charges by converting a light incident from the exterior during an integration interval. The photoelectric conversion unit PD includes a photo diode that generates photo-charges in response to a light.

In the event that the unit pixel AP is a unit pixel of a CMOS image sensor, a shutter of the CMOS image sensor is opened during the integration interval. The photoelectric conversion unit PD generates photo-charges such as electron-hole pairs based on an incident light passing through the opened shutter. Photo-charges thus generates are used to collect information associated with an image of the object and information associated with a peripheral light.

During a readout interval, the signal generating circuit SGC generates a pixel output signal VOUT based on the photo-charges generated by photoelectric conversion. In the event that the unit pixel AP is a unit pixel of a CMOS image sensor, a shutter of the CMOS image sensor is closed during the readout interval following the integration interval. The pixel output signal VOUT is generated based on information associated with an image of the object collected in form of charge carriers and information associated with a peripheral light. In FIG. 6, a plurality of analog pixel signals AS may be a combination of a pixel output signal VOUT provided from one unit pixel.

The unit pixel AP has a 1-transistor structure, a 3-transistor structure, a 4-transistor structure, or a 5-transistor structure according to the number of transistors included in the signal generating circuit SGC, and is configured to have such a structure that a plurality of pixels shares transistors partially. In FIG. 7, there is exemplarily illustrated a 4-transistor structure. That is, the signal generating circuit SGC includes a transfer transistor tT, a reset transistor rT, a drive transistor dT, and a select transistor sT, and includes a floating diffusion node FDN.

The transfer transistor tT has a first terminal connected to the photoelectric conversion unit PD, a second terminal connected to the floating diffusion node FDN, and a gate connected to receive a transfer signal TX. The transfer transistor tT transfers photo-charges generated from the photoelectric conversion unit PD to the floating diffusion node FDN.

The reset transistor rT has a first terminal connected to receive a power supply voltage VDD, a second terminal connected to the floating diffusion node FDN, and a gate connected to receive a reset signal RST. The reset transistor rT discharges charges accumulated on the floating diffusion node FDN such that a potential of the floating diffusion node FDN is set to a value.

The drive transistor dT has a first terminal connected to receive the power supply voltage VDD and a gate and a second terminal connected to the floating diffusion node FDN. The drive transistor dT acts as a source-follower buffer amplifier.

The select transistor sT has a first terminal connected to the second terminal of the drive transistor dT, a gate connected to receive a selection signal SEL, and a second terminal outputting a pixel output signal VOUT. The select transistor sT acts as a switch for addressing.

Returning to FIG. 6, a row driver and decoder 111b is connected to each row of an active pixel array 111a and generates a driving signal for driving each row. For example, the row driver and decoder 111b drives a plurality of unit pixels AP in the active pixel array 111a by a row unit.

A correlated double sampling circuit 112 performs a correlated double sampling operation on a plurality of analog pixel signals AS to generate a plurality of correlated double sampling signals SS. For example, the correlated double sampling circuit 112 performs a correlated double sampling operation in response to a difference between an analog reset signal and an analog data signal. The analog reset signal is a signal indicating a reset component of the analog pixel signals AS. The analog data signal is a signal indicating image and peripheral light components of the analog pixel signals AS.

The correlated double sampling circuit 112 outputs the correlated double sampling signals SS corresponding to an effective signal component based on a correlated double sampling result. The correlated double sampling circuit 112 may include a plurality of correlated double sampling circuits respectively connected to column lines of the active pixel array 111a. The correlated double sampling circuit 112 outputs the correlated double sampling signals SS corresponding to an effective signal component every column.

An analog-to-digital converter 113 performs analog-to-digital conversion on the correlated double sampling signals SS to generate pixel data PDAT. The analog-to-digital converter 113 includes a counter and a buffer. The counter of the analog-to-digital converter 113 counts the analog reset signal and the analog data signal to generate a counting signal. The counting signal is provided to the buffer. The buffer includes a plurality of latch circuits respectively connected to the column lines and latches the counting signal every column. The buffer outputs the latched counting signal as the pixel data PDAT.

A timing generator 114 controls the row driver and decoder 111b, the correlated double sampling circuit 112, and the analog-to-digital converter 113. The timing generator 114 provides signals (e.g., a clock signal, a timing control signal, etc.) required for operations of the row driver and decoder 111b, the correlated double sampling circuit 112, and the analog-to-digital converter 113.

In exemplary embodiments, the timing generator 114 may include a logic control circuit, a phase lock loop circuit, a timing control circuit, a communication interface circuit, etc.

A buffer 115 stores the pixel data PDAT output from the analog-to-digital converter 113. The buffer 115 amplifies the pixel data PDAT and outputs it as Bayer data.

The correlated double sampling circuit 112, the analog-to-digital converter 113, and the buffer of the image sensor 10 constitute an analog block. The timing generator 114 forms a digital block. Each block of the image sensor 10 is turned on selectively according to an operation mode and an operation interval. The image sensor 10 operates by a power suitable for each operation mode by selectively supplying a power to blocks.

Meanwhile, in a vision mode, the image sensor 10 generates sampled Bayer data. The image sensor 10 turns a digital block off such that a low resolution of Bayer data sampled is provided by a less power.

Figure 8:
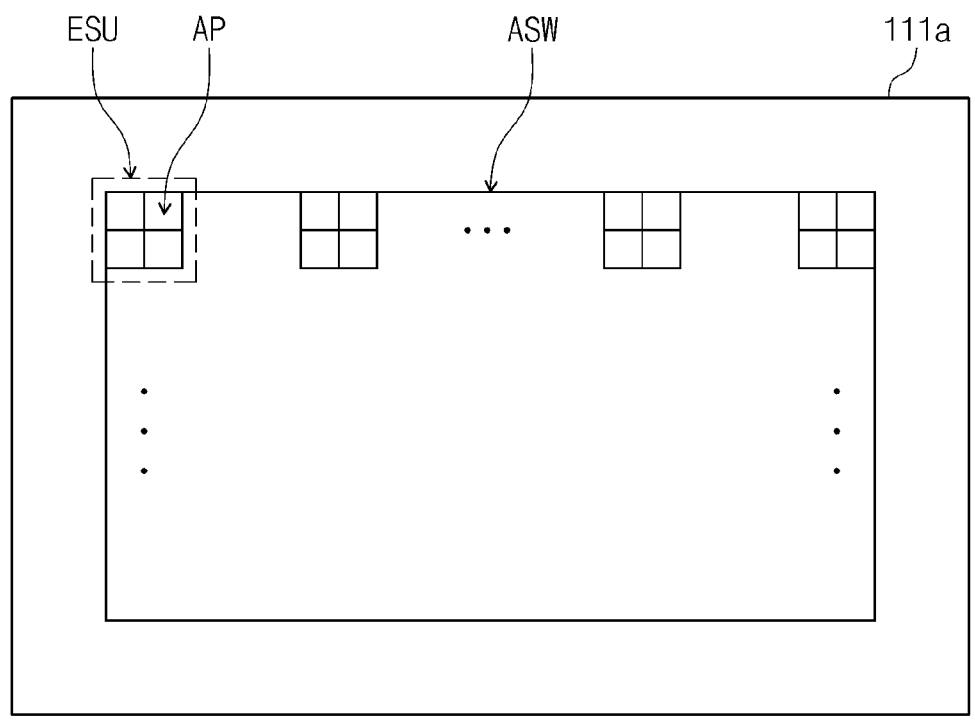
FIG. 8 is a diagram for describing a sampling operation of an image sensor 10.

FIG. 8 is a diagram for describing a sampling operation of an image sensor 10. Referring to FIG. 8, an active pixel array 111a of an image sensor 10 includes a plurality of unit pixels AP.

A sensing window ASW of the image sensor 10 is set to perform a crop operation on the active pixel array 111a. For example, the pixel array 111a has the size of 1412×1412, and the sensing window ASW has the size of 1280×1024. The size of the sensing window ASW is decided in response to a signal provided from an external device. Or, the size of the sensing window ASW is set to a size stored in a register of the image sensor 10.

The image sensor 10 performs a sub sampling operation on the sensing window ASW to select effective sensing units ESU of a plurality of peripheral unit pixels AP. For example, 80×64 effective sensing units ESU are selected by performing a 1/16 sub sampling operation on the sensing window ASW having the size of 1280×1024.

The image sensor 10 extracts effective pixel data, corresponding to effective sensing units, from among pixel data PDAT. As described above, the pixel data PDAT includes a plurality of pixel values corresponding to a plurality of unit pixels AP, and the effective pixel data includes pixel values corresponding to unit pixels included in the effective sensing units ESU.

In response to the control signal CTRL, the above-described image sensor 10 extracts effective pixel data based on a crop operation sub sampling operation instead of generating luminance data using pixel data PDAT. The image sensor 10 reduces power consumption by generating Bayer data based on effective pixel data.

Figure 9:
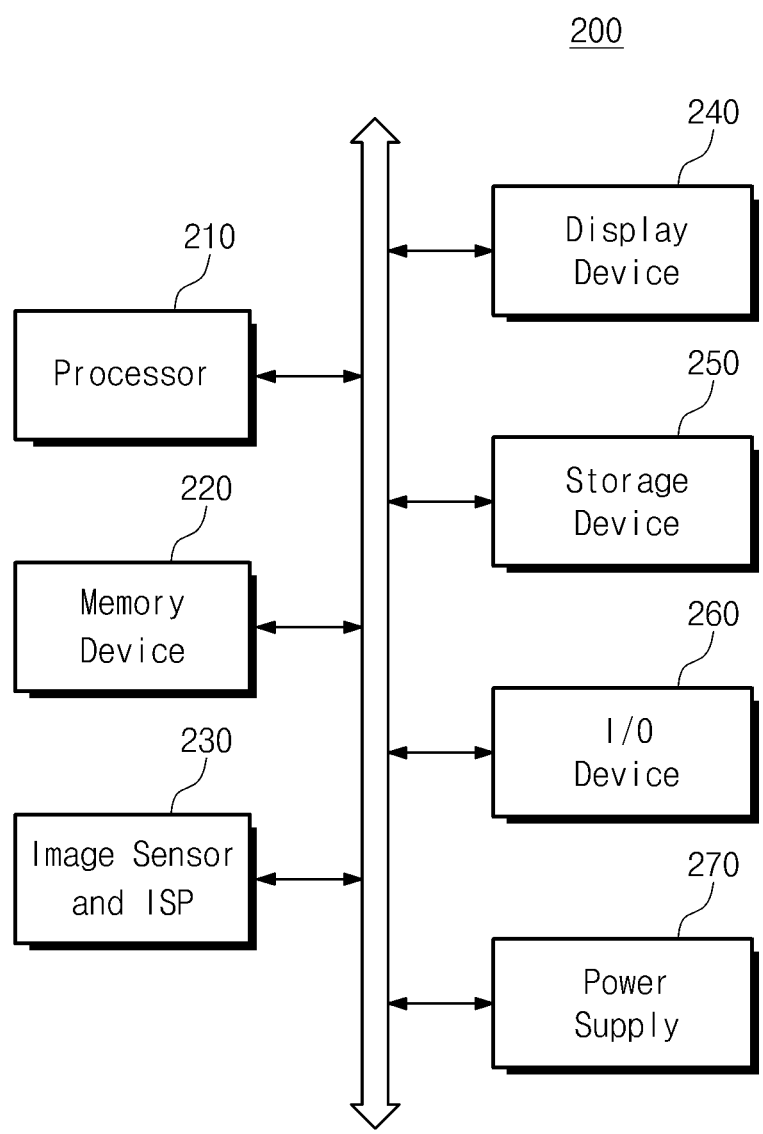
FIG. 9 is a block diagram schematically illustrating an electronic device including an image sensor, according to an example embodiment of inventive concepts.

FIG. 9 is a block diagram schematically illustrating an electronic device including an image sensor, according to an example embodiment of inventive concepts.

Referring to FIG. 9, an electronic device 200 includes an image sensor and image signal processor block 230 and a display device 230. The electronic device 200 further includes a processor 210, a memory device 220, a storage device 250, an input/output device 260, and a power supply 270.

The processor 210 performs particular calculations or tasks. In exemplary embodiments, the processor 210 may be a microprocessor or a Central Processing Unit (CPU). The processor 210 is connected to the memory device 220, the display device 240, the storage device 250, and the input/output device 260 through an address bus, a control bus, and a data bus for communications. In exemplary embodiments, the processor 210 may be connected to an extended bus such as a Peripheral Component Interconnect (PCI) bus.

The memory device 220 stores data needed for an operation of the electronic device 200. For example, the memory device 220 may include volatile memory devices such as a DRAM, an SRAM, etc. and nonvolatile memory devices such as an EPROM, an EEPROM, a flash memory device, a Phase-change RAM (PRAM), a Ferroelectric RAM (FRAM), a Resistive RAM (RRAM), a Magnetic RAM (MRAM), etc.

The storage device 250 may include a solid state drive, a hard disk drive, a CD-ROM, etc. The input/output device 260 may include input devices such as a keyboard, a keypad, a mouse, etc. and output devices such as a printer, etc.

The power supply 270 supplies an operation voltage needed for an operation of the electronic device 200. The power supply 270 selectively supplies a power to each block of an image sensor in the image sensor and image signal processor block 230 according to an operation mode of the electronic device 200.

The image sensor and image signal processor block 230 is connected to the processor 210 through the buses or other communication links for communications. The image sensor and image signal processor block 230 outputs image data and recognition information corresponding to the object, based on an optical signal including image information of the object and information of a peripheral light.

Blocks of the image sensor and image signal processor block 230 are selectively turned on according to an operation mode and an operation interval. In addition, the image sensor and image signal processor block 230 processes data using different paths, according to an operation mode. The image sensor and image signal processor block 230 operates by a power suitable for each operation mode, by selectively supplying a power to a block.

Also, the image sensor and image signal processor block 230 performs a crop operation and a sub sampling operation on a pixel array according to an operation mode. The image sensor of the image sensor and image signal processor block 230 operates by a less power by generating image data based on effective pixel data obtained using the crop and sub sampling operations.

The display device 240 displays an image based on image data. The display device 240 may be one of display devices such as a Liquid Crystal Display (LCD) device, a Light Emitting Diode (LED) device, an Organic LED (OLED) device, a Field Emission Display (FED) device, etc.

In example embodiments, the electronic device 200 or components of the electronic device 200 may be packaged using any of various types of packaging technologies. Examples of such packaging technologies include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

In example embodiments, the electronic device 200 may be mobile systems such as a mobile phone, a smart phone, a PDA, a PMP, a digital camera, a music player, a portable game console, a navigation system, etc. or computing systems such as a personal computer, a server computer, a workstation, a laptop computer, a digital television, etc.

Although not shown in FIG. 9, the electronic device 200 may further comprise ports capable of communicating with a video card, a sound card, a memory card, a USB device, etc. or with other electronic devices. Also, the electronic device 200 may further comprise a baseband chipset, an application chip set, etc.

Figure 10:
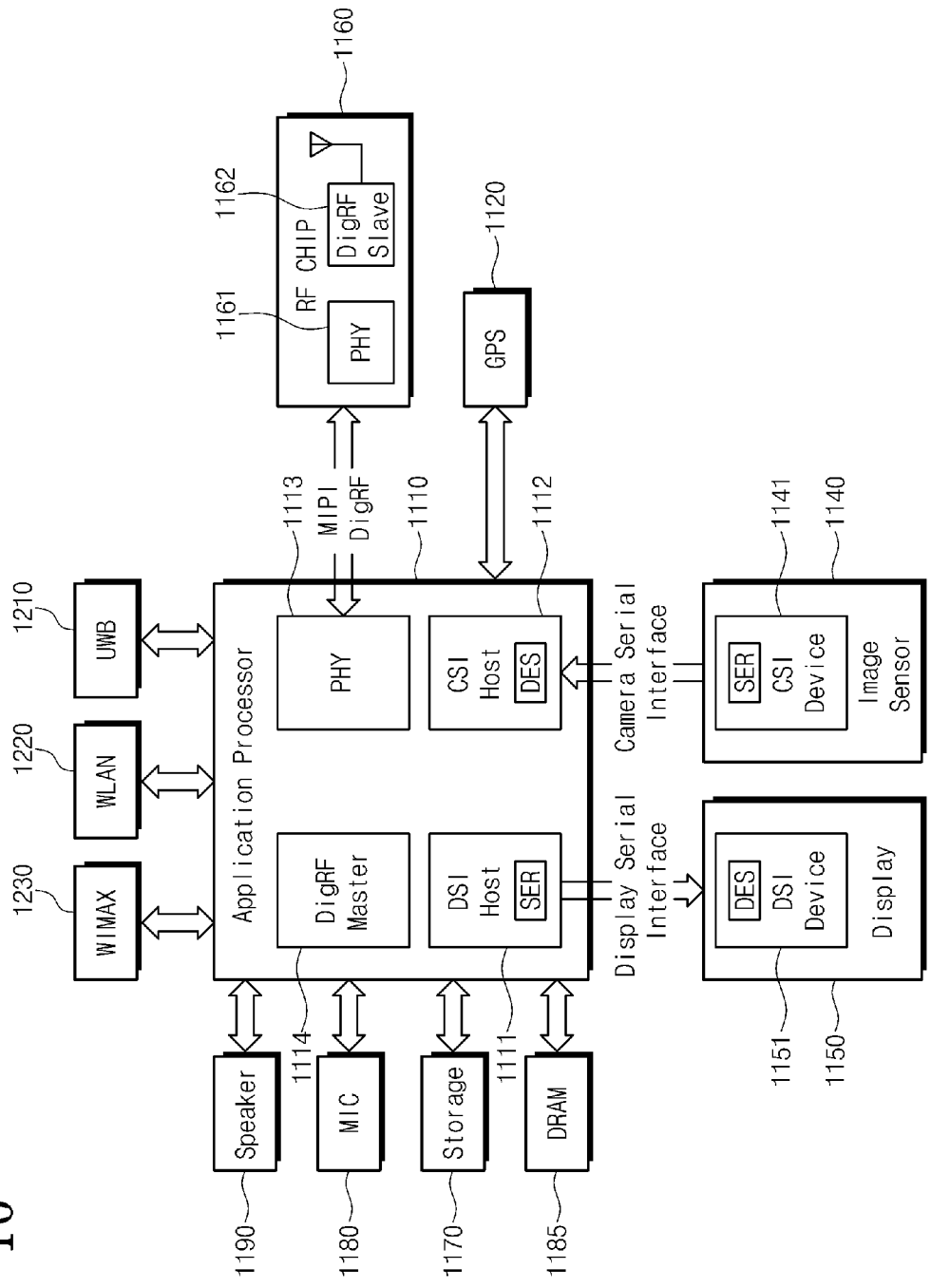
FIG. 10 is a block diagram schematically illustrating an interface used in an electronic device illustrated in FIG. 9, according to an example embodiment of inventive concepts.

FIG. 10 is a block diagram schematically illustrating an interface used in an electronic device illustrated in FIG. 9, according to an example embodiment of inventive concepts.

Referring to FIG. 10, an electronic device 1000 is implemented by a data processing device (e.g., a cellular phone, a PDA, a PMP, a smart phone, etc.) using or supporting an MIPI interface. The electronic device 1000 includes an application processor 1110, an image sensor 1140, a display 1150, etc.

A Camera Serial Interface (CSI) host 1112 of the application processor 1110 performs serial communication with a CSI device 1141 of the image sensor 1140 through a CSI. In exemplary embodiments, the CSI host 1112 includes an optical deserializer DES, and the CSI device 1141 includes an optical serializer SER. A Display Serial Interface (DSI) host 1111 of the application processor 1110 performs serial communication with a DSI device 1151 of the display 1150 through a DSI. In exemplary embodiments, the DSI host 1111 includes an optical serializer SER, and the DSI device 1151 includes an optical deserializer DES.

Also, the electronic device 1000 further comprises a Radio Frequency (RF) chip 1160 capable of performing communications with the application processor 1110. PHY 1113 of the electronic device 1000 and PHY 1161 of the RF chip 1160 perform data transmission and reception operations according to MIPI (Mobile Industry Processor Interface) DigRF. Also, the application processor 1110 further comprises a DigRF MASTER 1114 controlling data transmission and reception operations according to the MIPI DigR. The RF chip 1160 further comprises a DigRF SLAVE 1162 controlled through the DigRF MASTER 1114.

Meanwhile, the electronic device 1000 further comprises a Global Positioning System (GPS) 1120, storage 1170, a microphone 1180, a DRAM 1185, and a speaker 1190. Also, the electronic device 1000 communicates using an Ultra WideBand (UWB) 1210, a Wireless Local Area Network (WLAN) 1220, a Worldwide Interoperability for Microwave Access (WIMAX) 1230, etc. The above-described structure and interface of the electronic device 1000 is an example, and inventive concepts are not limited thereto.

While inventive concepts have been described with reference to example embodiments, it will be apparent to those skilled in the art that various changes and modifications may be made without departing from the spirit and scope of inventive concepts. Therefore, it should be understood that example embodiments are not limiting, but illustrative.

What is claimed is:

1. An image sensor, comprising:
a plurality of operation circuits configured to provide an image signal in response to incident light, the plurality of operation circuits including,
an active pixel array configured to generate an analog signal based on the incident light,
at least one analog circuit configured to convert the analog signal into an image signal as a digital signal, and
a digital circuit configured to control the active pixel array and the at least one analog circuit; and
a power supply configured to selectively supply power to at least one operation circuit of the plurality of operation circuits based on a selected operation mode or operation interval,
wherein the operation mode is one of at least a first mode and a second mode,
a resolution of the image signal in the second mode is lower than a resolution of the image signal in the first mode,
the power supply is configured to turn off the at least one analog circuit and the digital circuit during an integration interval of the second mode.

2. The image sensor of claim 1, wherein the image sensor is configured to generate the image signal as Bayer data based on a Bayer pattern.

3. The image sensor of claim 1, wherein the power supply block is configured to turn off the at least one analog circuit during an integration interval of the first mode,
wherein the image sensor generates photo-charges based on the incident light during the integration interval of the first mode.

4. The image sensor of claim 1, wherein the active pixel array comprises:
a plurality of unit pixels, the active pixel array configured to generate the analog signal using selected unit pixels of the plurality of unit pixels in the second mode.

5. An electronic device, comprising:
an image sensor including a plurality of operation circuits, the plurality of operation circuits including,
an active pixel array configured to generate an analog signal based on an incident light,
at least one analog circuit configured to convert the analog signal into an image signal as a digital signal, and
a digital circuit configured to control the active pixel array and the at least one analog circuit, the image sensor configured to selectively turn on the plurality of operation circuits according to an operation mode;
an image signal processor configured to process the image signal to generate image data and selectively provide an image signal processing path according to the operation mode; and
a sensor controller configured to control the operation mode of the image sensor and the image signal processor,
wherein the operation mode is one of at least a first mode and a second mode,
a resolution of the image signal in the second mode is lower than that in the first mode, and
the image sensor is configured to turn off the at least one analog circuit and the digital circuits during an integration interval of the second mode.

6. The electronic device of claim 5, wherein the sensor controller is configured to control the operation mode of the image sensor and the image signal processor in response to a mode signal provided from an external device.

7. The electronic device of claim 5, wherein the image signal processor
is configured to select a Bayer data processing path in response to the control signal.

8. The electronic device of claim 5, wherein the at least one analog circuit comprises:
a correlated double sampling circuit configured to perform a correlated double sampling operation on the analog signal to generate a correlated double sampling signal; and
an analog-to-digital converter configured to digitalize the correlated double sampling signal to generate the image signal.

9. The electronic device of claim 5, wherein the active pixel array comprises an active pixel array formed of a plurality of unit pixels, the active pixel array configured to generate the analog signal using selected unit pixels of the plurality of unit pixels in the second mode.

10. The electronic device of claim 5, wherein
the digital circuit includes a timing generator configured to provide clock signals to the active pixel array, and
the image sensor includes a power supply configured to turn off the timing generator during a portion of the second mode.

11. The electronic device of claim 5, wherein the second mode is a recognition mode.

12. An electronic device comprising:
an image sensor including a plurality of operation circuits, the plurality of operation circuits including,
an active pixel array circuit configured to generate an analog signal based on an incident light,
at least one analog circuit configured to convert the analog signal into an image signal as a digital signal, and
a digital circuit configured to control the active pixel array and the at least one analog circuit, the image sensor configured to selectively turn on the plurality of operation circuits according to an operation mode;
an image signal processor configured to process the image signal to generate image data and selectively provide an image signal processing path according to the operation mode; and
a sensor controller configured to control the operation mode of the image sensor and the image signal processor,
wherein the operation mode is one of at least a first mode and a second mode,
a resolution of the image signal in the second mode is lower than that in the first mode,
the digital circuit includes a timing generator configured to provide clock signals to the active pixel array,
the image sensor includes a power supply configured to turn off the timing generator during a portion of the second mode, and
the power supply is configured to apply power to the timing generator during an integration interval of the first mode, and the image sensor is configured to generate photo-charges based on incident light from an exterior during the integration interval of the first mode.

* * * * *